No. 828,504. PATENTED AUG. 14, 1906.
D. V. C. RAPP.
SEED DISTRIBUTER.
APPLICATION FILED MAR. 7, 1906.
2 SHEETS—SHEET 1.
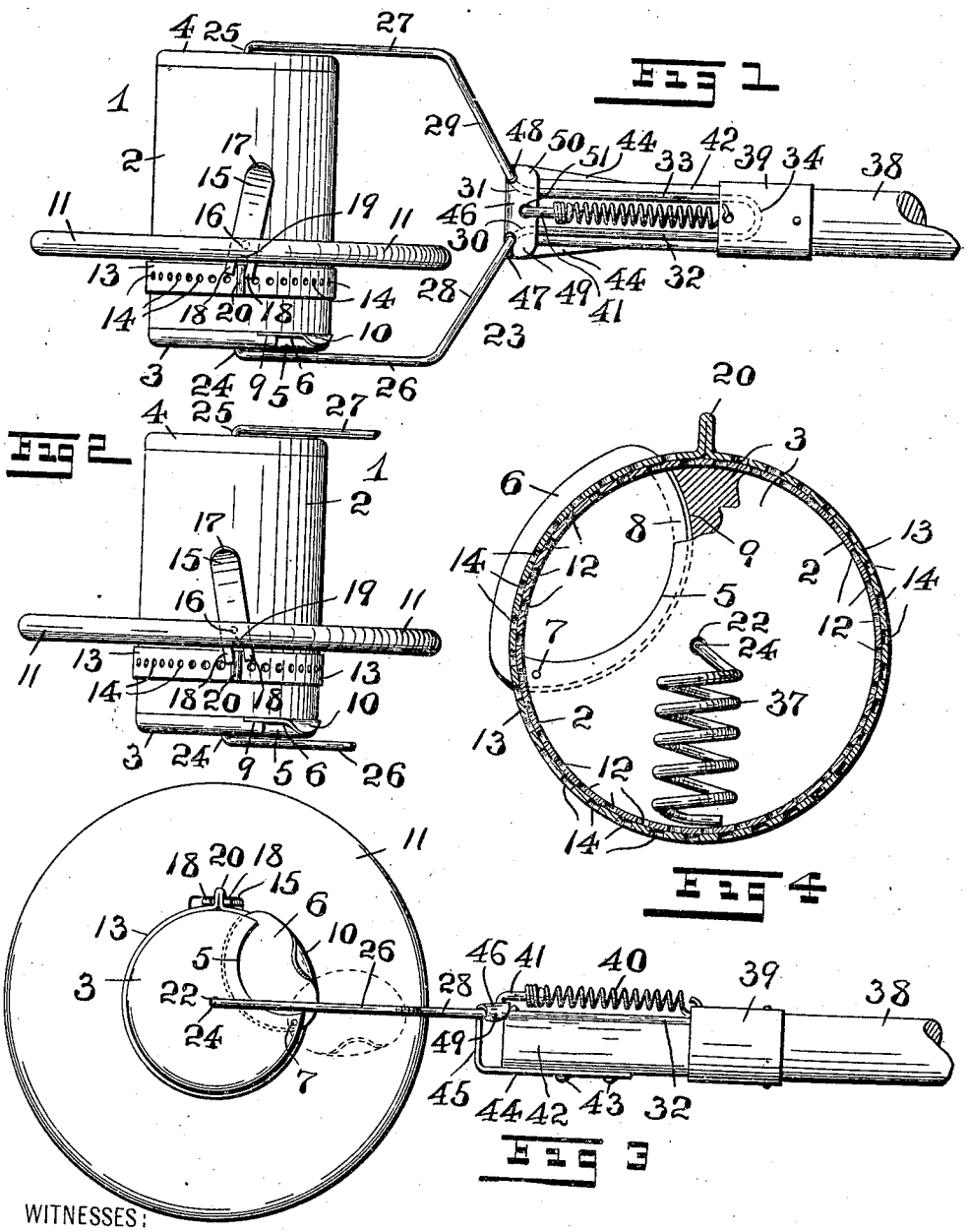
WITNESSES:
Frederick Jamison
Geo. D. Richards
INVENTOR:
Daniel V. C. Rapp
BY
Fred C. Fraentzel,
ATTORNEY

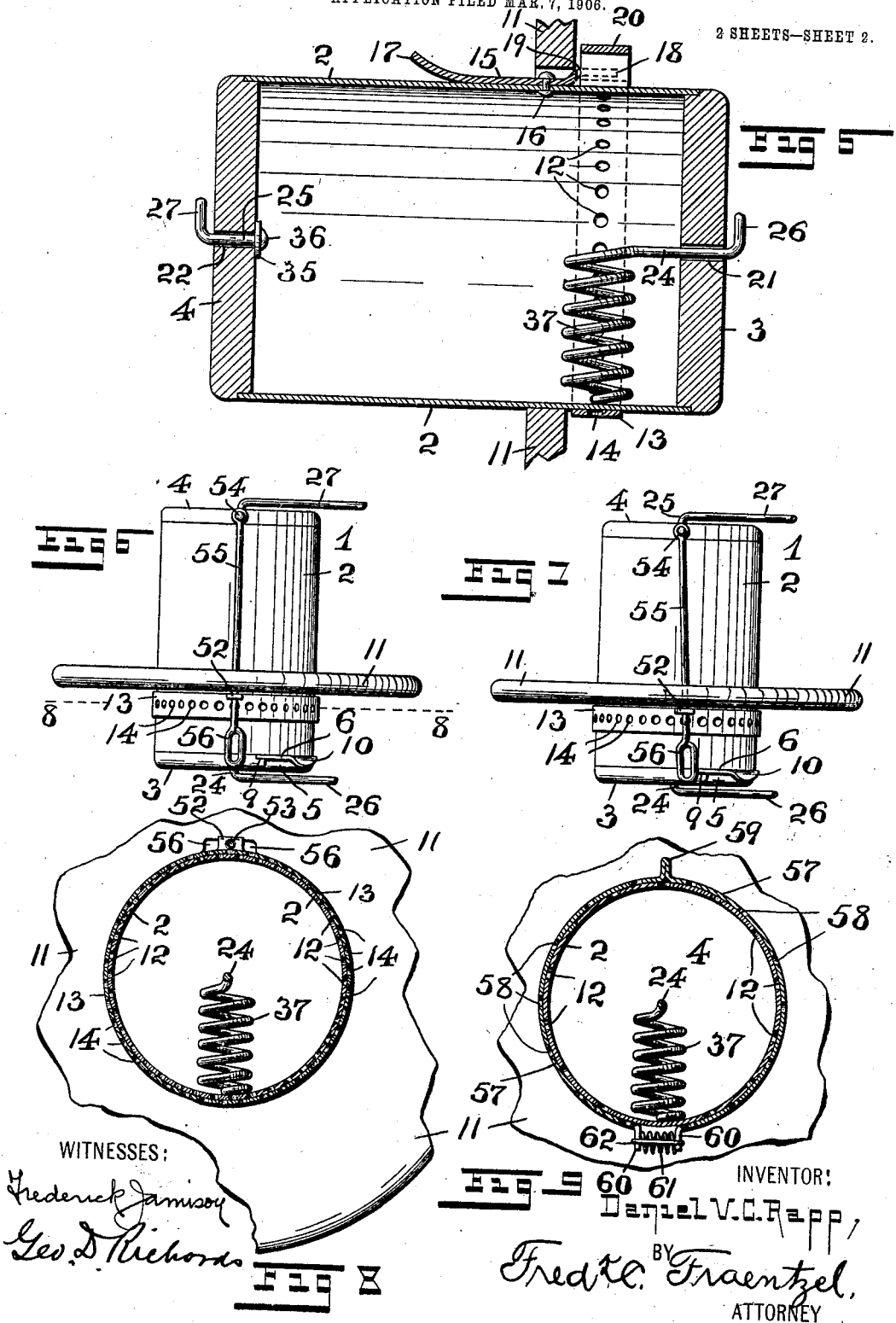

UNITED STATES PATENT OFFICE.

DANIEL V. C. RAPP, OF JERSEY CITY, NEW JERSEY.

SEED-DISTRIBUTER.

No. 828,504.  Specification of Letters Patent.  Patented Aug. 14, 1906.

Application filed March 7, 1906. Serial No. 304,682.

*To all whom it may concern:*

Be it known that I, DANIEL V. C. RAPP, a citizen of the United States, residing at Jersey City, in the county of Hudson and State of New Jersey, have invented certain new and useful Improvements in Seed-Distributers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference generally to improvements in seed-distributers; and the present invention relates more particularly to a novel construction of rotary seed-distributers provided with adjustable seed-outlets, which can be made large or small, according to the kinds of seeds which are to be distributed.

The main purpose of this invention is to provide a simply-constructed seed-distributer which can be easily used for arranging seeds of the various kinds in rows and the tool or implement being especially adapted for use in small beds, such as are arranged in hothouses and beneath hot glasses.

A further object of this invention is to provide an implement of the character hereinafter more especially set forth which may be provided with a large handle detachably secured to the implement, so that the same can be used upon a field or in the garden.

Other objects of this invention not at this time more particularly mentioned will be clearly understood from the following detailed description of the device.

My present invention consists, therefore, in the novel seed-distributer hereinafter more fully set forth; and, furthermore, the invention consists in the various novel arrangements and combinations of devices and parts, as well as in the details of the construction of the same, all of which will be hereinafter more fully set forth and then finally embodied in the clauses of the claim which are appended to and which form an essential part of this specification.

The invention is clearly illustrated in the accompanying drawings, in which—

Figure 1 is a top view of a seed-distributer embodying the principles of my present invention, the same being shown with a long and detachable handle, which handle is represented, however, as having its main grasping portion broken away, the seed-distributing openings in said figure being shown closed. Fig. 2 is a similar view of the said seed-distributer with its finger-piece or holding-shank being shown broken away and with the long and detachable handle omitted from said view, the seed-distributing openings in the figure being shown open. Fig. 3 is a side or end view of the device represented in said Fig. 1, and Fig. 4 is a transverse vertical section of the said device, on an enlarged scale, said section being taken on a plane directly through the seed-distributing openings and the said movable opening and closing device arranged over said openings looking in a direction away from the rotary support of the device and showing the seed-distributing openings and said opening and closing device in their closed relation with each other. Fig. 5 is a longitudinal vertical section of the said device, said section being taken centrally from end to end of the said device. Figs. 6 and 7 are top views of a modified form of seed-distributer provided with a slightly-modified construction of the opening and closing device, Fig. 6 representing the closed positions of the parts and Fig. 7 the opened positions of the said parts; and Fig. 8 is a transverse vertical section taken on line 8 8 in said figure 6, the said view showing also in part portions of the rolling support of the device; and Fig. 9 is a transverse vertical section through the seed-distributing openings of still another modified form of means for opening and closing the seed-distributing openings.

Referring now to the several figures of the drawings, the reference character 1 indicates the main body of the seed-distributer, the same consisting of a hollow cylinder 2, provided with the solid ends 3 and 4, one of which, as 3, is cut away, as at 5, (see Figs. 3 and 4 of the drawings,) to provide an opening for pouring a quantity of seed within said hollow cylinder or barrel. The said opening is closed by means of a suitable gate 6, which moves upon a pin 7 and has its marginal edge portion 8 inserted in a correspondingly-formed groove or slot 9 in said end 4 of the cylinder or barrel, as is clearly indicated in Fig. 4 of the drawings, in which a portion of the said end 3 is represented in vertical section, showing the arrangement of said edge portion 8 of said gate within said groove or slot 9. The said gate is held in its closed relation over said opening by the frictional contact of the sides of the said marginal edge portion 8 with the respective sides or faces of the said groove or slot 9, as will be clearly understood, a finger-piece or lug 10 being provided for bringing said gate into its opened position. (Indicated in dotted outline in said Fig. 3.) Encircling the outer cylindrical surface of said barrel or cylinder 2 is a rolling support 11, said support being suitably secured in a fixed position upon said barrel or cylinder 2, so that when said support is rolled upon the ground in the manner and for the purpose to be presently described a rolling or revolving motion of the said barrel or cylinder 2 is also produced, as will be clearly evident. At or near one end of the said barrel or cylinder, or, in fact, in any suitable part, are a series of perforations or holes 12, over which is slidably aranged a flat band or ring 13, which is also provided with a series of perforations or holes 14, the arrangement and number of said perforations or holes 14 corresponding to the arrangement and number of the said perforations or holes 12, so that the said holes 14 may be made to register wholly with the said holes 12, or only partly so, or the said band or ring 13 may be brought into the positions indicated in said Figs. 1 and 4, whereby the perforations or holes 12 in the barrel or cylinder 2 are entirely closed. To produce a sliding movement of said flat band or ring 13 in either direction for opening or closing or for partially opening the seed-distributing perforations or holes, a lever or arm 15, which is pivoted to the said barrel or cylinder 2 upon a pin, post, or rivet 16, is provided, the said lever or arm 15 being formed at one end with a finger-piece 17 and having a pair of fingers 18 upon its opposite end, which form a slot 19 between them, so as to embrace the opposite sides of a projection, lug, or extension 20 upon said ring or band 13, as clearly illustrated in said Figs. 1 and 2 of the drawings.

Referring now to Fig. 5 of the drawings, it will be seen that the end 3 is provided with a bearing portion 21, and the end 4 is in like manner provided with a bearing portion 22. Extending into the bearing 21 is a journal portion 24 of a wire frame 23, (see Fig. 1,) and within the bearing portion 22 is a journal portion 25 of the same frame. This frame 23 is made with the rearwardly-extending members 26 and 27 and the inwardly-bent members 28 and 29, said member 28 being formed with a curved portion 30 and the member 29 with a curved portion 31, from which extend, respectively, a pair of parallel and closely-located arms 32 and 33, which are connected by means of a curved portion 34, and are all arranged so as to form a suitable handpiece by means of which the rolling support 11 may be rolled over the surface of the ground.

To prevent the displacement of the said journal portion 25 from the bearing portion 22, a suitable disk or washer 35 and rivet-head or clenched portion 36 may be employed, substantially as shown in Fig. 5 of the drawings, and extending downwardly from the end portion of the journal 24, within said bearing portion 21, is an agitator or stirring device 37. This device is preferably made in the form of a spiral having its lower free end portion terminating in close juxtaposition to the series of inner perforations or holes 12 of the barrel or cylinder 2.

The operation of the device, briefly, is as follows: During the filling of the cylinder or barrel 2 with the seed the ring or band 13 is arranged in such a position that it will close the holes or perforations in the said cylinder or barrel. After having closed the gate 6 the holes or perforations 14 in the ring 13 are made to register with the holes or perforations 12 in the cylinder or barrel 2 by bringing the lever or arm 15 from the position shown in Fig. 1 to the position shown in Fig. 2 of the drawings to open the said perforations or holes the desired degree, according to the kind of seed to be distributed. Now by taking hold of the handpiece formed by the arm 32 and 33 the device can be rolled over the surface of the dirt of the bed to be planted, and the seed is distributed in lines wherever desired.

When the device is to be used in large beds, such as are made in the garden or in the field, then it is desirable to use in connection with the arms 32 and 33 a long handle 38, which is detachably connected with the said arms 32 and 33 in the following manner: Slidably arranged upon said handle 38 is a metal ferrule 39, to which is attached the one end portion of a coiled spring 40, said spring having at its other end a suitable hook or fastening device 41. Secured to the under surface of the free end portion 42 of said handle 38 by means of screws or pins 43 is a plate 44, said plate being provided with an upwardly-extending end piece 45, which is formed at its upper edge with a rearwardly-extending portion 46, formed with the two receiving slots or openings 47 and 48 and the retaining-lugs 49 and 50, as clearly illustrated in Figs. 1 and 3 of the drawings. The curved portions 30 and 31 of the respective members 28 and 29 are arranged beneath the holding or retaining lugs 49 and 50 in such a manner that the arms 32 will rest directly upon the upper and flat surface of the free end portion 42 of said handle 38. The ferrule 39 is then slipped over the curved part 34 of the said arms 32 and 33, and the hook 41 of the spring 40 is forced into a hole or perforation 51 in the rearwardly-extending part 46 of the said plate 44. In this manner the coils of the spring become distended, tending to pull the holding portions of the projection 46 of the plate 44 in firm retaining or holding engagement with the curved parts 49 and 50, located, respectively, between the arms 28 and 32 and arms 29 and 33, and at the same time retaining the ferrule 39 in its secure and positive holding engagement with the connecting member 34 between said arms 32 and 33. In this manner it will be clearly seen that the said handle 38 may be employed for rolling the device over the ground, but is detachably connected with the frame 23, so as to enable the use of the arms 32 and 33 as a handpiece when the seed-distributer is to be used with hotbeds or the beds found in greenhouses.

Referring now to Figs. 6, 7, and 8, I have employed a slightly-modified means for producing the sliding movements of the flat ring or band 13 for opening and closing the various seed-distributing openings. In this case the said band or ring 13 is made with an upwardly-extending projection 52, said projection or lug being provided with a hole or perforation 53. Pivotally arranged upon a pin or post 54 is a rod 55, which extends forwardly through an opening in the rolling support 11 and through the said perforation or hole 53 in the lug or projection 52 of the band or ring 13, the said rod 55 being provided with a suitable finger-piece 56, by means of which a laterally-oscillating motion of the said band or ring 13 may be produced.

Another modified form of means for regulating the seed-distributing openings is shown in Fig. 9 of the drawings. In this construction I employ a flat band or ring 57, provided with holes or perforations 58, the said band or ring 57 being formed with a finger-piece 59 and being made with a pair of right-angle holding portions or fingers 60, between which is arranged a spring 61, held between said fingers by means of a suitably-constructed link 62, which is arranged about and is secured to the said holding portions or fingers in any suitable manner.

From the foregoing description of my invention it will be seen that I have devised a simply and cheaply constructed seed-distributer which can be used for distributing seeds of the various kinds, both large and small, according to the kinds of seeds to be distributed, and which when the handle 38 is detached from the frame 23 can be conveniently used in small hotbeds and upon the beds arranged in tiers in green or hot houses.

I claim—

1. A seed-distributer comprising a revoluble hollow body, provided with a rolling support located nearer one end of the body than at its other end, said body being provided also with a series of seed-distributing openings closely located to said rolling support, means for opening and closing said openings, and a seed-stirrer in said body, substantially as and for the purposes set forth.

2. A seed-distributer comprising a revoluble hollow body provided with a series of seed-distributing openings, means for opening and closing said openings, and a spirally-formed seed-stirrer in said body, substantially as and for the purposes set forth.

3. A seed-distributer comprising a revoluble hollow body provided with a rolling support located nearer one end of the body than at its other end, said body being provided also with a series of seed-distributing openings closely located to said rolling support, a ring slidably arranged over said openings, said ring being provided with openings corresponding to the openings in said hollow body, means for producing a sliding movement of said ring for opening and closing the seed-distributing openings, and a seed-stirrer in said body, substantially as and for the purposes set forth.

4. A seed-distributer comprising a revoluble hollow body provided with a series of seed-distributing openings, a ring slidably arranged over said openings, said ring being provided with openings corresponding to the openings in said hollow body, means for producing a sliding movement of said ring for opening and closing the seed-distributing openings, and a spirally-formed seed-stirrer in said body, substantially as and for the purposes set forth.

5. A seed-distributer comprising a revoluble hollow body provided with a rolling support located nearer one end of the body than at its other end, said body being provided also with a series of seed-distributing openings closely located to said rolling support, a ring slidably arranged over said openings, said ring being provided with openings corresponding to the openings in said hollow body, means for producing a sliding movement of said ring for opening and closing the seed-distributing openings, consisting of a lug or projection on said ring, and an oscillating arm or lever on said body, said arm or lever having a forked end in engagement with said lug or projection of said ring, and a seed-stirrer in said body, substantially as and for the purposes set forth.

6. A seed-distributer comprising a revoluble hollow body provided with a series of seed-distributing openings, a ring slidably arranged over said openings, said ring being provided with openings corresponding to the openings in said hollow body, means for producing a sliding movement of said ring for opening and closing the seed-distributing openings, consisting of a lug or projection on said ring, and an oscillating arm or lever on said body, said arm or lever having a forked end in engagement with said lug or projection of said ring, and a spirally-formed seed-stirrer in said body, substantially as and for the purposes set forth.

7. A seed-distributer comprising a hollow body provided with a series of seed-distributing openings, a rolling support surrounding said body, a spirally-formed seed-stirrer in said body, and means for opening and closing said openings, substantially as and for the purposes set forth.

8. A seed-distributer comprising a hollow body provided with a series of seed-distributing openings, a rolling support surrounding said body, a spirally-formed seed-stirrer in said body, a ring slidably arranged over said openings, said ring being provided with openings corresponding to the openings in said hollow body, and means for producing a sliding movement of said ring for opening and closing the seed-distributing openings, substantially as and for the purposes set forth.

9. A seed-distributer comprising a hollow body provided with a series of seed-distributing openings, a rolling support surrounding said body, a spirally-formed seed-stirrer in said body, a ring slidably arranged over said openings, said ring being provided with openings corresponding to the openings in said hollow body, and means for producing a sliding movement of said ring for opening and closing the seed-distributing openings, consisting of a lug or projection on said ring, and an oscillating arm or lever on said body, said arm or lever having a forked end in engagement with said lug or projection of said ring, substantially as and for the purposes set forth.

10. A seed-distributer comprising a tubular cylinder having solid ends, one of said ends being provided with an opening, said end having a receiving-groove bounding a portion of said opening, a pivoted gate arranged for closing the said opening, said gate when closed having a portion of its edge in frictional engagement with the sides of said receiving-groove, said cylinder being provided with a series of seed-distributing openings, a rolling support surrounding said cylinder, and means for opening and closing said openings, substantially as and for the pusposes set forth.

11. A seed-distributer comprising a tubular cylinder having solid ends, one of said ends being provided with an opening, said end having a receiving-groove bounding a portion of said opening, a pivoted gate arranged for closing the said opening, said gate when closed having a portion of its edge in frictional engagement with the sides of said receiving-groove, said cylinder being provided with a series of seed-distributing openings, a rolling support surrounding said cylinder, a ring slidably arranged over said openings, said ring being provided with openings corresponding to the openings in said hollow body, and means for producing a sliding movement of said ring for opening and closing the seed-distributing openings, substantially as and for the purposes set forth.

12. A seed-distributer comprising a tubular cylinder having solid ends, one of said ends being provided with an opening, said end having a receiving-groove bounding a portion of said opening, a pivoted gate arranged for closing the said opening, said gate when closed having a portion of its edge in frictional engagement with the sides of said receiving-groove, said cylinder being provided with a series of seed-distributing openings, a rolling support surrounding said cylinder, a seed-stirrer in said cylinder, a ring slidably arranged over said openings, said ring being provided with openings corresponding to the openings in said hollow body, and means for producing a sliding movement of said ring for opening and closing the seed-distributing openings, substantially as and for the purposes set forth.

13. A seed-distributer comprising a tubular cylinder having ends, each end being provided with a bearing portion, said cylinder being provided with a series of seed-distributing openings, means for opening and closing said openings, a rolling support surrounding said cylinder, a frame provided with journal portions arranged in the respective bearing portions of the ends of said cylinder, means on one end of said journal portion to prevent displacement from its bearing portion, and a seed-stirrer connected with the other journal portion and terminating directly above the seed-distributing openings, said frame being provided with hand members, and a handle detachably secured to said hand members, substantially as and for the purposes set forth.

14. A seed-distributer comprising a tubular cylinder having ends, each end being provided with a bearing portion, said cylinder being provided with a series of seed-distributing openings, means for opening and closing said openings, a rolling support surrounding said cylinder, a frame provided with journal portions arranged in the respective bearing portions of the ends of said cylinder, means on one end of said journal portion to prevent displacement from its bearing portion, and a seed-stirrer connected with the other journal portion and terminating directly above the seed-distributing openings, said frame being provided with hand members, said members having a connecting portion, a handle, and means for detachably connecting said handle, with said hand members, consisting of a plate on said handle, retaining-lugs on plate for engagement with said hand members, a slidable ferrule on said handle adapted to be slid over said connecting portion of the hand members, and a spring between said ferrule and said plate upon said handle, substantially as and for the purposes set forth.

15. A seed-distributer comprising a tubular cylinder having ends, each end being provided with a bearing portion, said cylinder being provided with a series of seed-distributing openings, means for opening and closing said openings, a frame provided with journal portions arranged in the bearing portions of the ends of said cylinder, a spirally-formed seed-stirrer extending from one of said journal portions of said frame, said frame being provided also with hand members, and a handle detachably secured to said hand members, substantially as and for the purposes set forth.

16. A seed-distributer comprising a tubular cylinder having ends, each end being provided with a bearing portion, said cylinder being provided with a series of seed-distributing openings, means for opening and closing said openings, a frame provided with journal portions arranged in the bearing portions of the ends of said cylinder, and a spirally-formed seed-stirrer extending from one of said journal portions of said frame, said frame being provided also with hand members, said members having a connecting portion, a handle, and means for detachably connecting said handle with said hand members, consisting of a plate on said handle, retaining-lugs on plate for engagement with said hand members, a slidable ferrule on said handle adapted to be slid over said connecting portion of the hand members, and a spring between said ferrule and said plate upon said handle, substantially as and for the purposes set forth.

In testimony that I claim the invention set forth above I have hereunto set my hand this 5th day of March, 1906.

DANIEL V. C. RAPP.

Witnesses:
FREDK. C. FRAENTZEL,
GEO. D. RICHARDS.